T. J. Kindleberger,
Cider Mill.
Nº 12,953.                    Patented May 29, 1855.
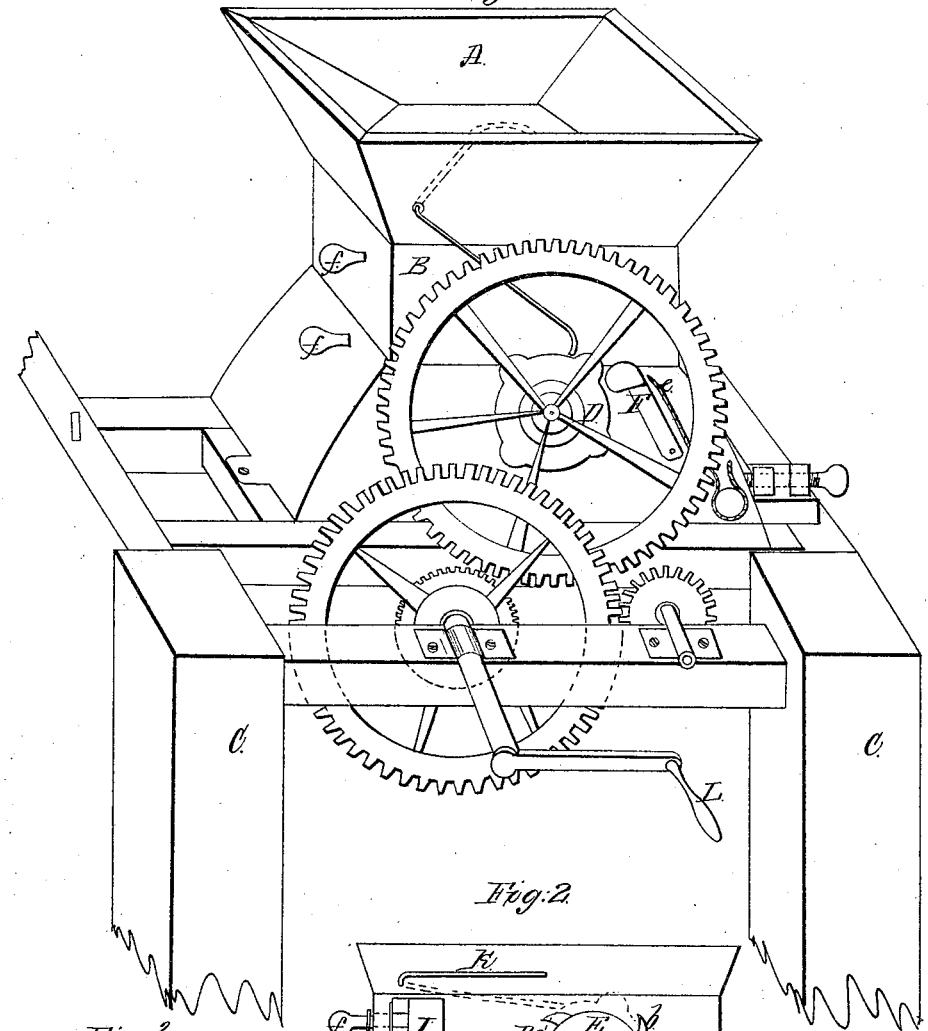
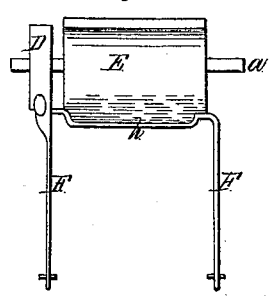
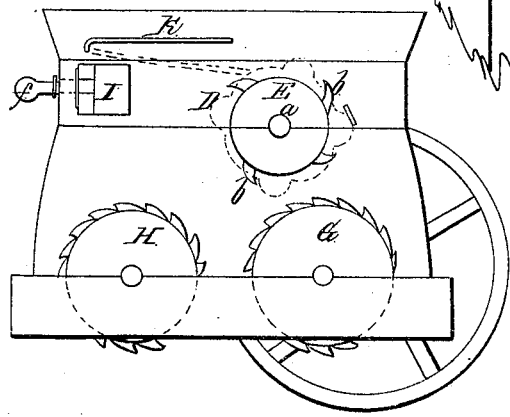

UNITED STATES PATENT OFFICE.

TOBIAS J. KINDLEBERGER, OF SPRINGFIELD, OHIO.

CIDER-MILL.

Specification forming part of Letters Patent No. 12,953, dated May 29, 1855; Reissued August 14, 1866, No. 2,332.

*To all whom it may concern:*

Be it known that I, T. J. KINDLEBERGER, of Springfield, in the county of Clark and State of Ohio, have invented certain new and useful Improvements in Cider-Mills; and I do hereby declare that the following is a full, clear, and exact description of the same, reference being had to the accompanying drawings, forming a part of this specification.

These hand mills being so desirable, a substitute for the old fashioned horse mills renders an efficient operating one, a matter of importance to the farmer, hence the frequent attempts to produce one possessed of superior qualities; this I think I have accomplished; so constructing my mills, that while they reduce the apple to a pulp they will be free from choaking, and by an improvement in cleaning the feeding rollers by a scraper which is made to perform its function upon the body of the roller, yet at the same time without injury to the blades or knives with which the roller is armed.

It consists in placing a cam upon the same shaft on which the roller is secured and which in connection with, and operating upon a pair of uprights, between which the scraper extends the scraping and cleaning is effected, while the edges of the knives are preserved. This cam also operates upon an apple tilter, which disturbing or stirring the apples in the hopper prevents the choaking of the mill while the movable block closing or opening the throat more effectually secures the object.

The mill may be described as follows—A, is the hopper; B, the side of the box carrying the rollers, &c.; C, C, legs supporting the framing and machine; D, a cam, secured on the same shaft *a*, that the feed roller E, Fig. 2, is placed, this roller armed with four knives *b, b*, extending longitudinally upon its surface, and it is for the protection of the edges of these knives that the scraper extending from side to side, is made to retreat by the cam D, as the knives approach.

F, is one of a pair of uprights pivoted at *d* between which the scraper is attached; behind F, is shown a spring *e*, which keeps F, in contact with the cam.

G and H, are crushing rollers placed between the feed roller, and between which the further reduction of the fruit is effected. They are moved by suitable gear as shown in Fig. 1.

I is a movable block sliding in grooves or ways in the sides of the box below the hopper, and are made to approach the roller E, by set screws *f, f*, when the contraction of the throat of the mill requires it in supplying the requisite quantity of fruit to avoid choaking. Above it, is the apple tilter K formed of a bent or forked rod, one end thereof entering the hopper among the apples, the other being outside and operated on by the cam D. The apples being thrown into the hopper with the throat of the mill contracted as required by the block I, upon turning the winch or handle L, the feed roller E, is turned and the knives thereon chop the apples, the scraper *h*, keeping the roller clear without injury to the edge of the knives, the fruit falls between rollers H and G, and is reduced to as fine a pulp as requisite, dropping from these last rollers into a receiving trough between them.

Having described my improvement, what I claim as my invention, and desire to secure by Letters Patent is—

So arranging the scraper *h*, in connection with the roller E, that it shall perform its office without injury to the edge of the knives by means of the cam D, operating substantially in the manner described, for preparing the fruit for the crushing rollers G and H, in combination with the apple tilter K, for the purpose set forth in the foregoing specification.

In testimony whereof I have hereunto signed my name before two subscribing witnesses.

T. J. KINDLEBERGER.

Witnesses:
GEO. SPENCE,
JOHN THOMAS.